United States Patent [19]

Suzuki

[11] 4,420,655

[45] Dec. 13, 1983

[54] CIRCUIT TO COMPENSATE FOR DEFICIT OF OUTPUT CHARACTERISTICS OF A MICROPHONE BY OUTPUT CHARACTERISTICS OF ASSOCIATED OTHER MICROPHONES

[75] Inventor: Takuya Suzuki, Hamamatsu, Japan

[73] Assignee: Nippon Gakki Seizo Kabushiki Kaisha, Hamamatsu, Japan

[21] Appl. No.: 277,077

[22] Filed: Jun. 25, 1981

[30] Foreign Application Priority Data

Jul. 2, 1980 [JP] Japan .................................. 55-90333

[51] Int. Cl.[3] .............................................. H04B 15/00

[52] U.S. Cl. .................................. 381/94; 179/121 D

[58] Field of Search ........... 179/1 DM, 1 MN, 1 VC, 179/121 D, 1 P, 1 F, 115.5 DV

[56] References Cited

U.S. PATENT DOCUMENTS

| | | | |
|---|---|---|---|
| 4,006,310 | 2/1977 | Bayer | 179/1 VC |
| 4,066,842 | 1/1978 | Allen | 179/1 P |
| 4,131,760 | 12/1978 | Christensen et al. | 179/1 P |
| 4,239,936 | 12/1980 | Sakoe | 179/1 P |
| 4,266,099 | 5/1981 | Kayalioglu | 179/1 P |
| 4,322,579 | 3/1982 | Kleis et al. | 179/1 P |
| 4,357,488 | 11/1982 | Knighton et al. | 179/1 VC |

FOREIGN PATENT DOCUMENTS

| | | | |
|---|---|---|---|
| 640324 | 3/1978 | Fed. Rep. of Germany | 179/1 P |
| 53-108419 | 9/1978 | Japan | 179/121 D |

*Primary Examiner*—G. Z. Rubinson

*Assistant Examiner*—Robert Lev

*Attorney, Agent, or Firm*—Spensley, Horn, Jubas & Lubitz

[57] ABSTRACT

A circuit for compensating for frequency characteristic of microphone output which is arranged to have a combination of a microphone member of the pressure gradient type having a proximity effect represented by a rise in its low frequency range sensitivity as the microphone member approaches closer to a source of sound, and another microphone member of the pressure type developing no proximity effect, to cancel out the occurrence of proximity effect. A change in sensitivity of the pressure gradient type microphone in the low frequency range due to the proximity effect is determined from the level difference between the outputs of the two microphones. A signal representative of the difference is subtracted from the output of the pressure gradient type microphone thereby to effect a compensation for the proximity effect in the output of the pressure gradient type microphone.

12 Claims, 7 Drawing Figures

CIRCUIT TO COMPENSATE FOR DEFICIT OF OUTPUT CHARACTERISTICS OF A MICROPHONE BY OUTPUT CHARACTERISTICS OF ASSOCIATED OTHER MICROPHONES

BACKGROUND OF THE INVENTION (a) Field of the Invention

The present invention relates to a circuit which, by the use of a plurality of associated microphones, compensates for abnormal output characteristics of one of these microphones by the output characteristics of the other microphones involved. More particularly, the present invention utilizes a plurality of microphones having different acoustic-to-electric characteristics, and aims to obtain excellent overall acoustic-to-electric characteristics by making positive use of the advantages of the respective microphones employed.

(b) Description of the Prior Art

As is well known, microphones vary in type, including the type represented by the acoustic-to-mechanical transducing system and the type represented by the mechanical-to-electric transducing system. These known microphones are appropriately selected in actual use in accordance with the external conditions such as the condition of the source of sound being picked up and the condition of the place where the sound is picked up.

From the viewpoint of directional characteristics, there have been often used, in general, such directional microphones as the so-called bidirectional microphones, and the so-called unidirectional microphones. Such directional microphones have been used to achieve clear reception of the sound generated from the source thereof, and to prevent the occurrence of howling (acoustic feedback) phenomenon which could arise when the sound picked up is being reproduced simultaneously as the sound is being picked up, to thereby monitor the reproduced sound through a monitor speaker.

The aforesaid directional microphones have been realized usually by the microphones of either one of the following two types. One of them is a pressure gradient type microphone in which both sides of a diaphragm are exposed to the sound-generating source so that the diaphragm is driven by the difference in the pressures of sound which act on both sides of the diaphragm. The other of them is the so-called phase-shifting type microphone arranged so that the front side of the diaphragm is exposed directly to the sound source, and that an acoustic phase-shifting circuit is provided on the rear side of the diaphragm, to thereby perform the dual operations exerted by the so-called pressure type microphone and by the pressure gradient type microphone.

These known directional microphones are such that, because of the so-called proximity effect, when such microphone is moved closer to the source of sound, its sensitivity in the low frequency range of signal is elevated. Therefore, these known directional microphones have the drawback and inconvenience that, owing to the reason as mentioned above, there arises a variation in the quality of sound being recorded or picked up in accordance with the distance between the microphone and the source of sound. Thus, efforts have been made in the past to suppress the specific rise of sensitivity of microphone in the low frequency range of sound attributable to said proximity effect by providing acoustic circuit devices in the transducer, but with no ultimate successful achievement in the elimination of proximity effect. In order to compensate for such inconveniences, many of the prior techniques have employed the consideration that, in order that a sound may be picked up or recorded in better quality, a directional microphone such as a bidirectional microphone or a unidirectional microphone which is to be used at a position close to the source of sound is designed so that the sensitivity to the low frequency range of sound is lowered to a certain degree in view of the anticipated rise which would take place in its sensitivity to such low frequency range of sound when the microphone is used at a position close to the source of sound. On the other hand, in case a microphone is not provided with such consideration, there is additionally attached to the microphone system a sound quality adjustment device such as a tone-effector device or a tone control device for allowing the user to externally adjust the sensitivity of the microphone in the low frequency range, to thereby compensate for the imbalance of the frequency of the sound being recorded or picked up, by preliminarily lowering the response to the low frequency range of sound when the microphone is used in substantial proximity to the source of sound. Even through these various efforts of the prior techniques, it has been impossible to completely avoid such changes in quality of sound as are attributable to the distances of the microphone to the source of sound in use.

Such proximity effect, however, will not take place in the so-called nondirectional type microphones which are actuated by the pressure of a sound applied. Nevertheless, this nondirectional microphone is inferior to the above-mentioned directional microphones such as the pressure gradient type microphone or the phase-shifting type microphone, in performing clear recording or capture of a sound as well as in the prevention of howling at the time of simultaneous reproduction of the sound being picked up.

From the general point of view, both the pressure gradient type microphones and the phase-shifting type microphones can be termed as still being superior to the nondirectional microphones with respect to the quality and articulation of the sound being picked up or recorded and also to the prevention of howling, although the former two types have drawbacks resulting from the proximity effect.

SUMMARY OF THE INVENTION

A basic object of the present invention, therefore, is to provide a compensating circuit arranged so that, by a combination of a principal microphone having relatively good output characteristics and a compensating microphone, a performance advantage of the principal microphone is achieved while a drawback peculiar to this principal microphone is eliminated.

A first object of the present invention is to provide a compensating circuit of the type as described above, which serves to compensate for an abnormal rise in the sensitivity or response of the principal microphone in the low frequency range of sound to be picked up.

A second object of the present invention is to provide a compensating circuit of the type as described above, which, in case a directional microphone is used to serve as the principal microphone, prevents the proximity effect which is a drawback of such microphone, without requiring the operation of a sound quality adjustment device which will have to be specifically provided.

A third object of the present invention is to provide a compensating circuit of the type as described above, which greatly reduces pop noise components which could develop in case a directional microphone is employed to serve as the principal microphone.

A fourth object of the present invention is to provide a compensating circuit of the type as described above, which greatly reduces the low frequency range noises in case a directional microphone is employed to serve as the principal microphone.

DETAILED DESCRIPTION OF THE PREFERRED EMBODIMENT

Figure 1:
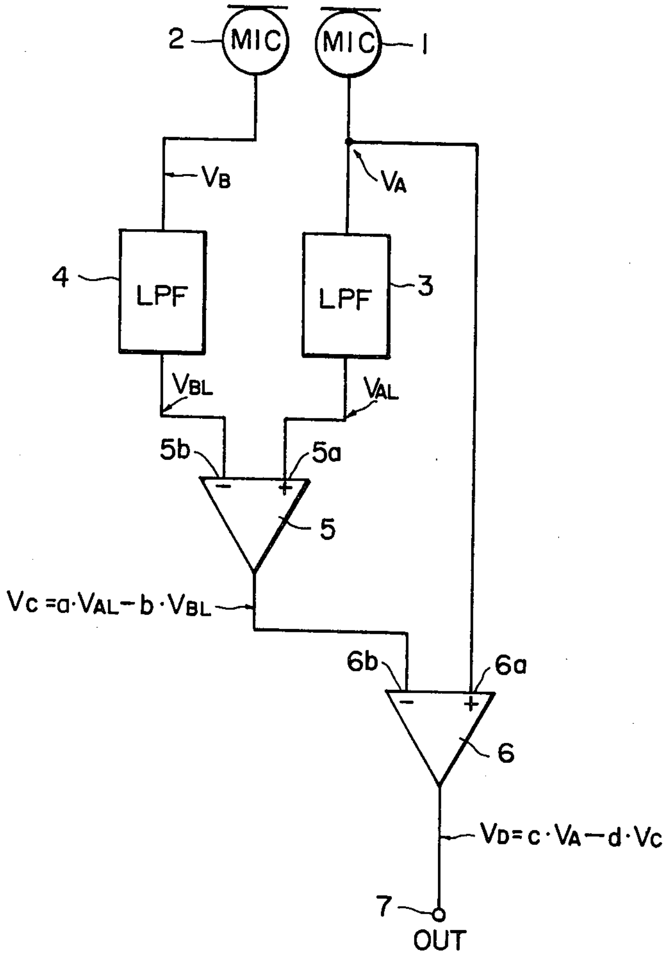
FIG. 1 is a block diagram of a microphone apparatus representing an embodiment of the present invention.
Figure 2:
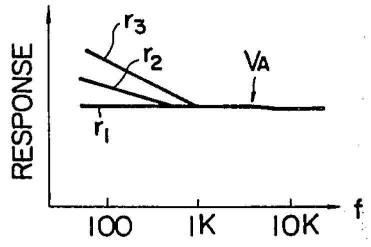
FIGS. 2 to 7 are frequency characteristics charts of outputs of the respective constituting parts of the microphone apparatus shown in FIG. 1.

By referring to FIG. 1, reference numeral 1 represents a principal microphone. This principal microphone 1 may be either a bidirectional or a unidirectional dynamic microphone of the pressure gradient type. This microphone being of the pressure gradient type, its output characteristics in the low frequency region is flat as indicated by the characteristic $r_1$ shown in FIG. 2 in case the distance between the microphone 1 and the source of sound (not shown) is great. However, as the position of the microphone 1 approaches progressively toward the source of sound, there appears a proximity effect as discussed earlier in this specification, and the sensitivity of this microphone in the low frequency region will rise to such levels as indicated by $r_2$ and $r_3$ in FIG. 2.

Figure 3:
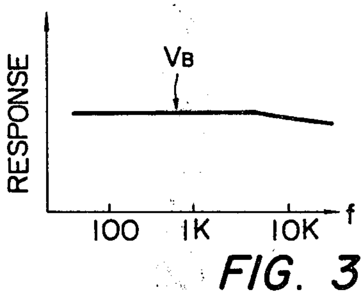

Numeral 2 represents a compensating microphone which hereinafter will be referred to as a sub-microphone relative to the principal microphone. This sub-microphone 2 is a nondirectional microphone of the pressure type, so that there develops no effect of proximity. This sub-microphone 2, however, is not required to have flat frequency characteristics extending up to the high frequency range, nor is it required to have reduced distortion in the middle as well as the high frequency regions to provide good sound quality. Instead, the sub-microphone is required only to exhibit flat frequency characteristics in both the middle and the low frequency ranges and to develop no proximity effect. FIG. 3 shows the output frequency characteristics of the sub-microphone 2.

The principal microphone 1 and the sub-microphone 2 are disposed at positions so very close to each other that they may be said to be disposed at substantially the same position. Therefore, they are so arranged that electric signals having a same phase relative to the sound inputted to these two microphones 1 and 2 are outputted from the two microphones 1 and 2, respectively.

Figure 4:
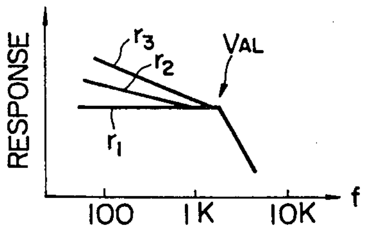
Figure 5:
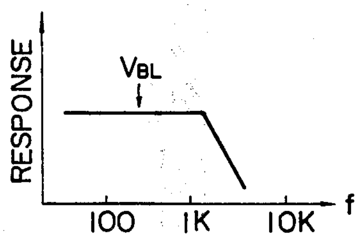

An output voltage $V_A$ of the principal microphone 1 is passed through a low-pass filter 3 to be applied therefrom to the non-inverting input terminal 5*a* of a differential amplifier 5. Whereas, an output voltage $V_B$ of the sub-microphone 2 is passed through another low-pass filter 4 to be applied to an inverting input terminal 5*b* of said differential amplifier 5. These two low-pass filters 3 and 4 are of a same arrangement, and are designed so as to pass therethrough only such low frequency range of signal as contributing to the development of a proximity effect. FIG. 4 shows the frequency characteristics of an output voltage $V_{AL}$ of the low-pass filter 3. These frequency characteristics represents one in which the middle and high frequency ranges from the output frequency characteristics shown in FIG. 2 of the principal microphone 1 have been removed. It should be understood, however, that, as a matter of course, a rise in the low frequency range sensitivity as indicated by $r_2$ and $r_3$ due to the proximity effect will remain. Also, FIG. 5 shows the frequency characteristics of an output voltage $V_{BL}$ of the low-pass filter 4. The characteristics will be appreciated as being substantially in agreement with the characteristics $r_1$ which represent the instance wherein there is no such rise in the low frequency range sensitivity due to the proximity effect as shown in FIG. 4.

Figure 6:
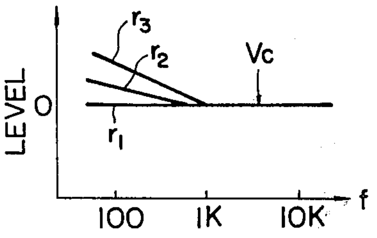

The differential amplifier 5 will output a differential signal $V_c = a \cdot V_{AL} - b \cdot V_{BL}$ which represents a differential signal between respective signals obtained by appropriately adjusting the two inputs voltages $V_{AL}$ and $V_{BL}$. And, the gains a and b of the two input systems of the differential amplifier 5 are adjusted so that, in case the principal microphone 1 has not undergone a rise in its sensitivity to the low frequency region of signal due to the proximity effect, the output voltage $V_c$ of the differential amplifier 5 will become substantially zero throughout the entire frequency band. Accordingly, when the principal microphone 1 has developed a rise in its sensitivity to the low frequency range of signal due to the proximity effect, only that low frequency range component of signal which has become elevated will be outputted from the differential amplifier 5. FIG. 6 shows the frequency characteristics of the output voltage $V_c$ of this differential amplifier 5. As shown in FIG. 6, the differential amplifier 5 will output a voltage of a level corresponding to the difference from the flat output characteristics of the principal microphone 1 in correspondence to the characteristics $r_2$ or $r_3$ indicating an elevated low frequency region due to the proximity effect in the output voltage $V_A$ of the principal microphone 1 shown in FIG. 2.

The output of the differential amplifier 5 is applied to an inverting input terminal 6*b* of another differential amplifier 6. To a non-inverting input terminal 6*a* of this differential amplifier 6 is applied the output voltage $V_A$ of the principal microphone 1. And, to said output voltage $V_A$ of the principal microphone 1, the output from the differential amplifier 5 will serve as a compensating voltage. From the differential amplifier 6 is outputted a differential voltage $V_D$ which is indicated by:

$$V_D = cV_A - d(a \cdot V_{AL} - b \cdot V_{BL})$$

wherein: c and d represent constants appropriately set as will be described later.

The output voltage $V_D$ from the differential amplifier 6 which appears at an output terminal 7 will serve as the output of the microphone apparatus.

Figure 7:
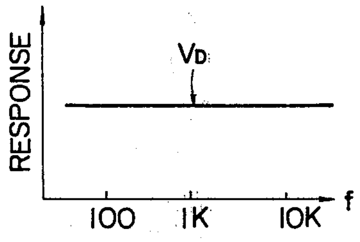

Accordingly, in case the principal microphone 1 is used in a place wherein no proximity effect develops, the output voltage $V_c$ of the differential amplifier 5 will be zero. Accordingly, the differential amplifier 6 outputs an appropriately amplified output voltage $V_A$ of the principal microphone 1. And, in case the principal microphone 1 shows a rise in its sensitivity in the low frequency range due to the proximity effect, there is derived from the differential amplifier 5 a differential voltage corresponding to the elevated amount of sensitivity. This differential voltage is subtracted from the output voltage $V_A$ of the principal microphone 1. As a result, there is outputted from the differential amplifier 6 a voltage which has compensated for the rise of sensitivity in the low frequency region in the output voltage of the principal microphone 1. Said constants c and d are set so as to enable such compensation to be effected. That is, the output frequency characteristic of the differential amplifier 6 will become a flat one throughout the entire frequency band as shown in FIG. 7. Especially, the compensation by the output of the differential amplifier 5 is applied only to the low frequency region component of the output of the principal microphone 1 only when there is developed a difference between the output level in the low frequency region of the principal microphone 1 and the output level in the low frequency region of the sub-microphone 2. It should be appreciated that, therefore, the features of the output characteristics of the principal microphone 1 such as the frequency characteristics which extends in flat form up to the high frequency range are not lost at all, and that only when there develops an undesirable phenomenon represented by elevation of level in the low frequency region due to the proximity effect, the compensation is carried out automatically.

The foregoing description points to the instance wherein the weight is placed on the proximity effect. It should be understood, however, that, by the adoption of the microphone apparatus having the foregoing arrangement, there can be obtained an excellent effect of noise reduction also for pop noises which could develop when a breath of a person or wind touches the microphone apparatus or for vibration noises in the low frequency range which could develop when an external mechanical vibration is applied to the microphone casing.

More particularly, because of the facts that the principal microphone 1 is of the pressure gradient type, and that the pop noise filter or wind screen which is to be attached to the microphone and a make of such material as a cloth or a metal net from the viewpoint of not spoiling the quality of sound cannot help being of a relatively simple structure, the principal microphone 1 will easily catch pop noises of high levels. In contrast thereto, the sub-microphone 2 is of the pressure type, and no weight is placed on the quality of sound or characteristics in the middle and high frequency ranges as discussed above, so that no problem would occur even when a substantially effective pop noise filter is attached to the sub-microphone 2. Thus, the levels of such pop noises of the sub-microphone 2 can be suppressed sufficiently low. Accordingly, there can be obtained a relatively large differential signal or voltage from the differential amplifier 5 with respect also to pop noises. Whereby, the output of the principal microphone 1 can be compensated for, and the pop noise components contained therein can be sufficiently attenuated.

Furthermore, the principal microphone 1 is of the pressure gradient type, and therefore, the amount of damping of vibration of the diaphragm is relatively small. Also, because this microphone 1 is of the dynamic type, the mass of the vibration system is relatively large.

Accordingly, the principal microphone 1 will easily pick up the vibration which is applied externally to the microphone casing, and will easily develop a large vibration noise. In contrast thereto, the sub-microphone 2 is of the pressure type, and accordingly it has a relatively large damping of the diaphragm. Also, in case this sub-microphone 2 adopts an electret type, the mass of the vibration system would become relatively small. Accordingly, the sub-microphone 2 will not easily pick up vibrations which are applied externally to its microphone casing, and thus the levels of the vibration noises which are generated will be low. As a result, there can be obtained a relatively large differential signal from the differential amplifier 5 with respect also to vibration noises. Whereby, the output of the principal microphone 1 is compensated for, and the vibration noise components contained therein can be sufficiently attenuated.

It should be appreciated also that there are provided a plurality of sub-microphones to compensate for the output voltage level of the principal microphone based on the difference or differences in levels between the output voltages of these plural sub-microphones and the output voltage of the principal microphone.

It should be appreciated further that there may be provided a plurality of principal microphones so that the compensated-for output voltages of these plural principal micropnones may be synthesized approximately.

It should be understood also that the acoustic-to-mechanical transducing system and the mechanical-to-electric transducing system of the respective microphones are not limited to those types mentioned above, and also that the directional arrangement of these microphones are not limited to those described above.

It should be noted also that the principal microphone, the sub-microphone, and further the circuit portions may be disposed within a same microphone casing. Alternatively, the principal microphone and the sub-microphone may be housed in separate casings, respectively.

What is claimed is:

1. A microphone system including a main microphone and a sub-microphone for compensating for frequency characteristics of the main microphone, the system further including:
   - first and second input terminals for receiving outputs of said main and sub-microphones, respectively;
   - detecting means for detecting a difference in the outputs of said main and sub-microphones;
   - compensating means for carrying out subtraction between the output of the detecting means and the output of said main microphone so as to compensate for output frequency characteristics of the output of said main microphone;
   - an output terminal connected to said compensating means; wherein:
   - said main microphone is one selected from a group consisting of a type operating in pressure gradient mode, and a type operating in both pressure gradient mode and pressure mode; and said sub-microphone is one operating in pressure mode; and wherein:
   - said main and sub-microphones are disposed close to each other to receive a substantially same acoustic input to deliver outputs of a same phase, respectively.

2. A microphone system according to claim 1, wherein said sub-microphone is of a nondirectional types and said main microphone is of either a unidirectional type or a bidirectional type.

3. A microphone system according to claim 1, wherein said compensating means compensates for a low frequency range characteristics of said main microphone.

4. A microphone system according to claim 2, further comprising:

low-pass filter means inserted separately between the input side of said detecting means and said main and sub-microphones, and passing therethrough only low frequency range signal components of said main and sub-microphones.

5. A microphone system according to claim 4, wherein said detecting means and said compensating means are comprised of differential amplifiers, respectively.

6. A microphone system according to claim 1, wherein said sub-microphone is one which does not develop a proximity effect in middle and low frequency ranges of its output.

7. A microphone system according to any one of claims 1 to 6, wherein said main and sub-microphones are housed within a same microphone casing.

8. A microphone system comprising:

a primary microphone of a type which exhibits a varying response in a low frequency range as a function of the distance between the microphone and a sound source;

a sub-microphone of a type exhibiting a substantially flat response in said low frequency range regardless of the distance between the sub-microphone and the sound source;

detecting means for comparing the outputs of the primary and sub-microphones and providing a compensation signal representative of the difference in low frequency response of the microphones;

compensation means for performing subtraction between the output of the primary microphone and the compensation signal to provide a system output having a substantially flat response in said low frequency range.

9. A microphone system as in claim 8 wherein the sub-microphone is relatively immune to vibration noise as compared to the primary microphone, whereby the compensation signal also represents the difference in outputs of the primary and sub-microphones caused by vibration noise picked up by the primary microphone, whereby the compensation means eliminates vibration noise from the output of the primary microphone as well as compensating for varying frequency response of the primary microphone.

10. A microphone system as in claim 8 further including a pop noise filter attached to the sub-microphone, whereby the compensation signal also represents the difference in the outputs of the primary and sub-microphones caused by pop noise picked up by the primary microphone, whereby the compensation means eliminates pop noise from the output of the primary microphone as well as compensating for varying frequency response of the primary microphone.

11. A microphone system comprising:

a primary microphone of a type exhibiting a varying response in a low frequency range as a function of the distance between the microphone and a sound source;

a sub-microphone of a type exhibiting a substantially flat response in said low frequency range regardless of the distance between the sub-microphone and the sound source;

low pass filter means connected to the outputs of the primary and sub-microphones;

detection means for detecting the difference between the filtered outputs of the microphones to provide a compensation signal representing the difference in low frequency response between the primary and sub-microphones;

compensation means for performing subtraction between the output of the primary microphone and the compensation signal to provide a system output having a flat response in the low frequency range regardless of variations in the response of the primary microphone.

12. A microphone system, comprising:

a primary microphone of a type exhibiting a proximity effect;

a sub-microphone of a type exhibiting substantially no proximity effect;

detection means for detecting differences in response between the primary and sub-microphones in a low frequency range; and compensation means for subtracting the output of the detection means from the output of the primary microphone to compensate for variations in the low frequency response of the primary microphone caused by the proximity effect.

* * * * *